United States Patent
Kim et al.

(10) Patent No.: US 10,730,398 B2
(45) Date of Patent: Aug. 4, 2020

(54) BATTERY CONTROL METHOD AND APPARATUS, BATTERY MODULE, AND BATTERY PACK

(71) Applicant: Samsung Electronics Co., Ltd., Suwon-si (KR)

(72) Inventors: YoungJae Kim, Seoul (KR); Taejung Yeo, Yongin-si (KR); Jinyong Jeon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/377,554

(22) Filed: Apr. 8, 2019

(65) Prior Publication Data

US 2019/0232801 A1 Aug. 1, 2019

Related U.S. Application Data

(63) Continuation of application No. 15/133,784, filed on Apr. 20, 2016, now Pat. No. 10,293,693.

(30) Foreign Application Priority Data

Apr. 21, 2015 (KR) .......................... 10-2015-0055650
Jan. 20, 2016 (KR) .......................... 10-2016-0007043

(51) Int. Cl.
*B60L 50/50* (2019.01)
*H02J 7/00* (2006.01)

(52) U.S. Cl.
CPC ................ *B60L 50/50* (2019.02); *H02J 7/00* (2013.01); *H02J 7/0021* (2013.01); *H02J 7/0068* (2013.01)

(58) Field of Classification Search
CPC . B60L 50/50; H02J 7/00; H02J 7/0021; H02J 7/0068
USPC ........................................................ 320/112
See application file for complete search history.

(56) References Cited

U.S. PATENT DOCUMENTS

| | | | |
|---|---|---|---|
| 6,275,004 B1 | 8/2001 | Tamai et al. | |
| 6,281,662 B1 | 8/2001 | Flohr | |
| 6,765,365 B2 * | 7/2004 | Kim ...................... | H02J 7/0042 320/106 |
| 6,771,045 B1 * | 8/2004 | Keller ................... | H02J 7/0016 320/118 |

(Continued)

FOREIGN PATENT DOCUMENTS

| | | |
|---|---|---|
| CN | 101431243 A | 5/2009 |
| CN | 101741118 A | 6/2010 |

(Continued)

OTHER PUBLICATIONS

European search report issued by the European Patent Office dated Oct. 10, 2016 for corresponding EP Patent Application No. 16166339.8.

(Continued)

*Primary Examiner* — M Baye Diao
(74) *Attorney, Agent, or Firm* — NSIP Law

(57) ABSTRACT

A battery control apparatus includes a processor configured to define each of output values of converters respectively corresponding to a plurality of batteries based on state information of each of the plurality of batteries, and a signal generator configured to generate control signals to control the converters to supply power corresponding to the output values to a load.

24 Claims, 10 Drawing Sheets

(56) References Cited

U.S. PATENT DOCUMENTS

| | | | |
|---|---|---|---|
| 6,882,129 B2* | 4/2005 | Boskovitch | H02J 7/0021 320/119 |
| 7,173,973 B2* | 2/2007 | Borran | H04L 1/0625 375/136 |
| 8,115,446 B2 | 2/2012 | Piccard et al. | |
| 8,129,952 B2 | 3/2012 | Lee | |
| 8,307,160 B2* | 11/2012 | Kazama | G06F 12/084 709/213 |
| 8,486,548 B2* | 7/2013 | Ueda | H01M 10/482 429/61 |
| 8,493,031 B2* | 7/2013 | Murao | H02J 7/0016 320/132 |
| 8,587,151 B2* | 11/2013 | Adest | H02M 3/1582 307/77 |
| 8,600,243 B2* | 12/2013 | Miao | H04B 10/2569 398/147 |
| 8,901,774 B2* | 12/2014 | Yan | H02J 1/08 307/82 |
| 8,972,765 B1* | 3/2015 | Krolak | H02J 7/0018 320/149 |
| 9,031,799 B2 | 5/2015 | Bae et al. | |
| 9,746,525 B2* | 8/2017 | Kudo | B60L 3/0046 |
| 2003/0191576 A1* | 10/2003 | Zarei | B60K 6/485 701/105 |
| 2006/0197508 A1* | 9/2006 | Matsumoto | F02D 41/20 323/201 |
| 2007/0126372 A1* | 6/2007 | Huang | H05B 41/2825 315/291 |
| 2007/0168058 A1* | 7/2007 | Kephart | G05B 9/03 700/82 |
| 2009/0067202 A1* | 3/2009 | Ichikawa | B60L 15/2045 363/79 |
| 2009/0195213 A1* | 8/2009 | Li | H02J 7/0016 320/136 |
| 2009/0322283 A1* | 12/2009 | Zhang | G01R 31/392 320/134 |
| 2010/0117593 A1 | 5/2010 | Piccard et al. | |
| 2011/0144517 A1 | 6/2011 | Cervantes | |
| 2012/0169117 A1 | 7/2012 | Park | |
| 2012/0185185 A1* | 7/2012 | Bae | H04Q 9/00 702/58 |
| 2013/0030737 A1* | 1/2013 | Okada | G01R 31/367 702/63 |
| 2013/0144547 A1 | 6/2013 | Yun et al. | |
| 2013/0155736 A1* | 6/2013 | Ilic | H02M 1/32 363/71 |
| 2013/0257383 A1* | 10/2013 | Shim | H02J 3/32 320/134 |
| 2014/0042815 A1* | 2/2014 | Maksimovic | H02J 1/00 307/63 |
| 2014/0042977 A1* | 2/2014 | Kim | H02J 7/0016 320/134 |
| 2014/0113828 A1* | 4/2014 | Gilbert | H01L 39/126 505/100 |
| 2014/0125284 A1 | 5/2014 | Qahouq | |
| 2014/0311239 A1* | 10/2014 | Marjanovic | G01F 23/20 73/296 |
| 2014/0312844 A1 | 10/2014 | Mercier et al. | |
| 2015/0364982 A1* | 12/2015 | Chae | H02M 3/157 307/52 |
| 2016/0105039 A1 | 4/2016 | Jeon et al. | |
| 2016/0118830 A1 | 4/2016 | Jeon et al. | |

FOREIGN PATENT DOCUMENTS

| | | |
|---|---|---|
| CN | 201926948 U | 8/2011 |
| JP | 2001-95163 A | 4/2001 |
| JP | 3398703 B2 | 4/2003 |
| JP | 5022623 B2 | 9/2012 |
| JP | 2013-089296 A | 5/2013 |
| JP | 5342860 B2 | 11/2013 |
| JP | 2014-3890 A | 1/2014 |
| JP | 2014-512788 A | 5/2014 |
| WO | WO 2007/125673 A1 | 11/2007 |
| WO | WO 2009/128226 A2 | 12/2009 |

OTHER PUBLICATIONS

Japanese Office Action dated Mar. 31, 2020 in corresponding Japanese Patent Application No. 2016-084741 (8 pages in English, 8 pages in Japanese).

Chinese Office Action dated May 13, 2020 in corresponding Chinese Patent Application No. 201610251498.8, (22 pages in English, 14 pages in Chinese).

European Office Action dated Apr. 30, 2020 in corresponding European Patent Application No. 16 166 339.8, (13 pages in English).

* cited by examiner

BATTERY CONTROL METHOD AND APPARATUS, BATTERY MODULE, AND BATTERY PACK

CROSS-REFERENCE TO RELATED APPLICATIONS

This application is a continuation of U.S. patent application Ser. No. 15/133,784 filed on Apr. 20, 2016 which claims the benefit under 35 USC 119(a) of Korean Patent Application Nos. 10-2015-0055650 filed on Apr. 21, 2015, and 10-2016-0007043 filed on Jan. 20, 2016, in the Korean Intellectual Property Office, the entire disclosures of which are incorporated herein by reference for all purposes.

BACKGROUND

1. Field

The following description relates to a control of a battery module or a battery cell.

2. Description of Related Art

When a charging and discharging is repetitively performed on a plurality of cells included in a battery, chemical differences or aging differences may occur in the plurality of cells. Due to the chemical differences or the aging differences, a voltage deviation or a capacity deviation may occur in the plurality of cells. Accordingly, one or more of the cells may be overcharged or overdischarged. As a result, a capacity of the battery may be reduced and a life of the battery may also be reduced due to a degradation of the battery.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a battery control apparatus includes a processor configured to define each of output values of converters respectively corresponding to a plurality of batteries based on state information of each of the plurality of batteries; and a signal generator configured to generate control signals to control the converters to supply power corresponding to the output values to a load.

The processor may be further configured to calculate state difference information of each of the plurality of batteries based on the state information, and determine whether the state difference information is within a preset range.

The processor may be further configured to define the output values of the converters using either one or both of the state difference information and a required power of the load based on a result of the determining.

The processor may be further configured to determine whether the state difference information has a negative value in response to the state difference information being determined not to be within the preset range; and the signal generator may be further configured to generate a control signal to control one of the converters corresponding to one of the batteries having state difference information having a negative value to charge the battery in response to the state difference information being determined to have a negative value.

Each of the output values of the converters respectively corresponding to the plurality of batteries may be a function of state difference information of a respective one of the plurality of batteries, the state difference information being calculated based on the state information.

The battery control apparatus may further include a communicator configured to transmit the control signals to the plurality of batteries.

The power corresponding to the output values of the converters may be supplied to a low-voltage load among the low-voltage load and a high-voltage load.

In another general aspect, a battery module includes a battery cell; a converter connected to the battery cell; and a controller configured to receive an output value defined based on state information of the battery module and another battery module from an external controller, and control the converter to supply power corresponding to the output value to a load.

The output value may be defined based on state difference information of the battery module in response to the state difference information being outside a preset range, the state difference information being calculated based on the state information of the battery module and the other battery module.

The output value may be a function of state difference information of the battery module, the state difference information being calculated based on the state information of the battery module and the other battery module.

The converter may be further configured to control the battery cell based on the output value.

The power corresponding to the output value of the converter may be supplied to a low-voltage load among the low-voltage load and a high-voltage load.

The battery module may be configured to be connected to the other battery module in series.

The battery module may further include a first connector including a low-voltage port connected to an output end of the converter; and a second connector configured to be connected to the other battery module.

In another general aspect, a battery pack includes a plurality of battery modules; converters respectively corresponding to the plurality of battery modules; and a main controller configured to define each of output values of the converters based on state information of each of the plurality of battery modules, and generate control signals to control the converters to supply power corresponding to the output values to a load.

The main controller may be further configured to calculate state difference information of each of the plurality of battery modules based on the state information of each of the plurality of battery modules, and determine whether the state difference information of each of the plurality of battery modules is within a preset range.

The main controller may be further configured to define the output values of the converters corresponding to the plurality of battery modules using the state difference information and a required power of a load based on a result of the determining.

Each of the plurality of battery modules may include a sub-controller configured to control a respective one of the converters to supply power corresponding to a respective one of the output values to the load.

Each of the output values may be a function of state difference information of a respective one of the plurality of battery modules, the state difference information being calculated based on the state information of each of the plurality of battery modules.

The battery pack may further include a first bus configured to supply high-voltage power output from the plurality of battery modules to a high-voltage load; and a second bus configured to supply low-voltage power output from the plurality of battery modules to a low-voltage load; and the high-voltage power may be power that has not been converted by the converters, and the low-voltage power may be power that has been converted by the converters based on the output values.

The converters may be connected in parallel.

The plurality of battery modules may be connected in series.

In another general aspect, a battery control method includes defining each of output values of converters respectively corresponding to a plurality of batteries based on state information of each of the plurality of batteries; and generating control signals to control the converters to supply power corresponding to the output values to a load.

The defining may include calculating state difference information of each of the plurality of batteries based on the state information; and determining whether the state difference information is within a preset range.

The defining may further include defining the output values of the converters using either one or both of the state difference information and a required power of the load based on a result of the determining.

The defining may further include determining whether the state difference information has a negative value in response to the state difference information being determined not to be within the preset range; and the generating may include generating a control signal to control one of the converters corresponding to one of the plurality of batteries having state difference information having a negative value to charge the battery in response to the state difference information being determined to have a negative value.

Each of the output values of the converters respectively corresponding to the plurality of batteries may be a function of state difference information of a respective one of the plurality of batteries, the state difference information being calculated based on the state information of each of the plurality of batteries.

The battery control method may further include transmitting the control signals to the plurality of batteries.

The power corresponding to the output values of the converters may be supplied to a low-voltage load among the low-voltage load and a high-voltage load.

In another general aspect, a device includes a battery pack including a plurality of battery modules, and converters respectively electrically connected to the plurality of battery modules; a low-voltage load electrically connected to the battery pack through the converters; and a high-voltage load electrically connected to the battery pack bypassing the converters.

The device may further include a main controller configured to calculate state difference information of each of the plurality of battery modules based on the state information of each of the plurality of battery modules, determine whether the state difference information is within a preset range, and define output values of the converters respectively electrically connected to the plurality of battery modules using the state difference information and a required power of a load based on a result of the determining.

The main controller may be further configured to transmit the output values of the converters to respective ones of the battery modules; and each of the battery modules may include a sub-controller configured to control a respective one of the converters to supply power corresponding to the output value to the low-voltage load.

In another general aspect, a battery control apparatus includes a plurality of batteries; a plurality of converters, each of the converters being connected to a respective one of the batteries and configured to supply power from the respective battery to a load; a processor configured to define respective output powers of the converters that will equalize respective states of charge of the batteries, each of the output powers being defined based on the state of charge of each of the batteries; and a signal generator configured to generate respective control signals for the converters to control the converters to supply the respective output powers to the load.

The battery control apparatus may further include a main controller including the processor and the signal generator; and a plurality of battery modules, each of the battery modules including a respective one of the batteries, a respective one of the converters connected to the battery, and a sub-controller; and the main controller may be configured to transmit the control signals to respective ones of the battery modules, and the sub-controller of each of the battery modules may be configured to receive a respective one of the control signals from the main controller, and control the respective one of the converters to supply a respective one of the output powers to the load.

The battery modules may be connected to one another so that the batteries are connected in series with each other and the converters are connected in parallel with each other.

The processor may be further configured to define the output power of each of the converters based on a power required by the load and the state of charge of each of the batteries.

The processor may be further configured to calculate an average power by dividing the power required by the load by a number of the batteries; calculate an average state of charge by averaging the states of charge of the batteries; and define the output power of each of the converters based on the average power and the average state of charge.

The processor may be further configured to calculate state of charge difference information for each of the batteries by subtracting the average state of charge from the respective state of charge of the battery; determine whether each of the state of charge difference information is within a preset range; define the output power of each of the converters to be the average power in response to a respective one of the state of charge difference information being within the preset range; and define the output power of each of the converters to be the average power plus a result of multiplying the average power by the respective one of the state of charge information in response to the respective one of the state of charge information being outside the present range.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only, and is not to be used to limit the disclosure. As used herein, the terms "a," ", an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms including technical and scientific terms used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 1A:
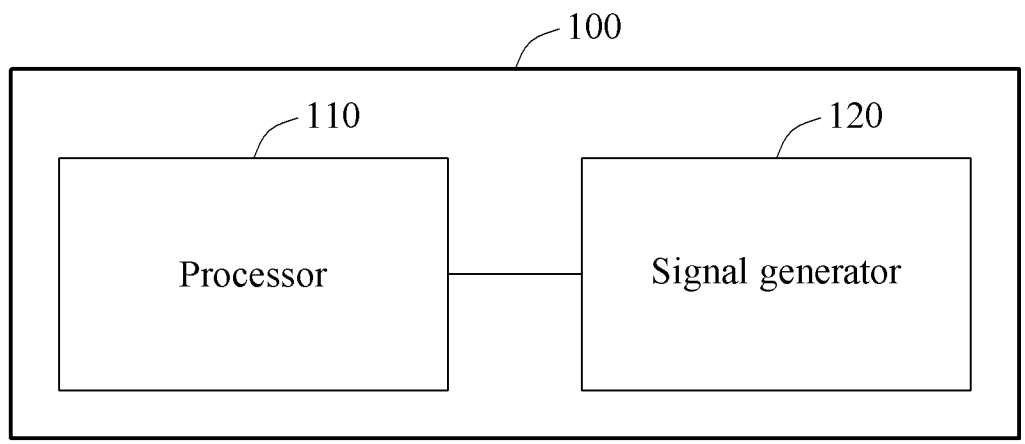
FIGS. 1A and 1B illustrate an example of a battery control apparatus.
Figure 1B:
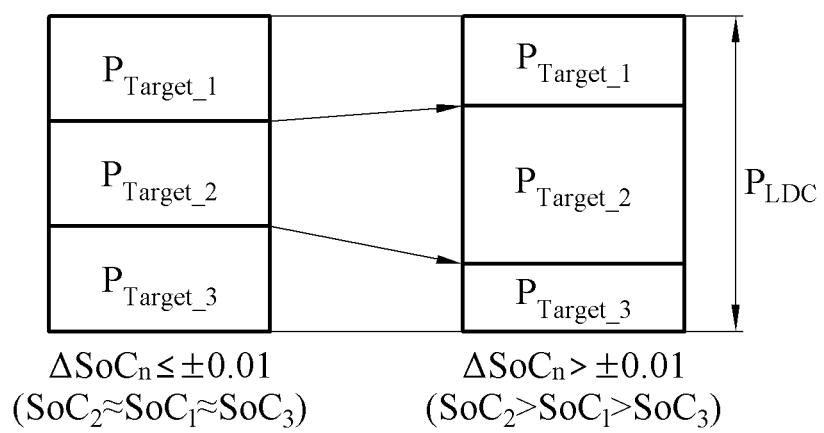

FIGS. 1A and 1B illustrate an example of a battery control apparatus.

Referring to FIG. 1A, a battery control apparatus 100 includes a processor 110 and a signal generator 120.

The processor 110 acquires sensing data of a plurality of batteries. Each of the plurality of batteries is, for example, a battery module or a battery cell. When each of the plurality of batteries is a battery module, the battery module includes a single battery cell or a plurality of battery cells. The plurality of battery cells included in the battery module are connected to one another in series.

The battery control apparatus 100 receives the sensing data from each of the plurality of batteries. The sensing data includes, for example, any one or any combination of any two or more of voltage data, current data, temperature data, and impedance data of a battery. In one example, each of the plurality of batteries includes a controller. The controller generates a control signal to sense any one or any combination of any two or more of a voltage, a current, a temperature, and an impedance of the battery. The sensing data of the battery is generated based on the control signal of the controller, and the controller transmits the sensing data to the battery control apparatus 100.

The battery control apparatus 100 and the controller included in each of the plurality of batteries may have a master-slave relationship. The battery control apparatus 100 operates as a master and transmits a command to the controller included in each of the plurality of batteries. The controller operates as a slave and receives the command from the battery control apparatus 100.

The processor 110 acquires state information of each of the plurality of batteries based on sensing data of each of the plurality of batteries. The state information includes, for example, any one or any combination of any two or more of state of charge (SoC) information, state of health (SoH) information, and a capacity. The processor 110 stores either one or both of the state information and the sensing data of each of the plurality of batteries in a memory.

The processor 110 defines an output value of a converter corresponding to each of the plurality of batteries based on the state information of the plurality of batteries. The converter is a direct current to direct current (DC/DC) converter and may be, for example, an isolated converter, a unidirectional converter, or a bidirectional converter. However, these are merely examples, and the converter is not limited thereto.

The processor 110 acquires state difference information of each of the plurality of batteries based on the state information of each of the plurality of batteries. As an example, the processor 110 calculates an average SoC $SoC_{average}$ based on an SoC of each of the plurality of batteries and calculates a difference $\Delta SoC$ between the $SoC_{average}$ and the SoC of each of the plurality of batteries. For example, the processor 110 calculates $\Delta SoC_n$ of a battery having an index n.

The processor 110 acquires a required power $P_{LDC}$ of a low-voltage load. Also, the processor 110 calculates average required power $P_{LDC\_average}$ of the low-voltage load.

The processor 110 determines whether the state difference information is within a first range. Also, based on a result of the determining, the processor 110 defines an output value $P_{Target\_n}$ of each converter using the state difference information and/or required power of a low-voltage load. In this example, the output value is defined differently for each converter so that a battery having a relatively large amount of power supplies a larger amount of power to the low-voltage load when compared to a battery having a relatively small amount of power. This causes the states of the plurality of batteries to be equalized.

In one example, when the state difference information $\Delta SoC_n$ has an absolute value less than or equal to 0.01, the processor 110 determines $P_{Target\_n}$ to be $P_{LDC\_average}$. When the state difference information $\Delta SoC_n$ has an absolute value greater than 0.01, the processor 110 determines $P_{Target\_n}$ to be $P_{LDC\_average}+P_{LDC\_average}*\Delta SoC_n$. Thus, when the state difference information $\Delta SoC_n$ has an absolute value less than or equal to 0.01, $P_{Target\_n}$ is equal to $P_{LDC\_average}$, and when the state difference information $\Delta SoC_n$ has an absolute value greater than 0.01, $P_{Target\_n}$ is a function of $P_{LDC\_average}$ and $\Delta SoC_n$. This is described in greater detail with reference to FIG. 1B. However, the value of 0.01 is merely an example, and other values may be used.

FIG. 1B illustrates an output value of each converter.

When the SoCs of the plurality of batteries are substantially the same, the output values of the converters are also substantially the same. For example, assuming that $P_{LDC}$=30 watts (W) in the example in FIG. 1B in which the number of converters is 3, $P_{LDC\_average}$=30/3=10 W. As indicated in a left portion of FIG. 1B, when an absolute value of $\Delta SoC_n$ is less than or equal to 0.01, an output value of each of the converters is defined to be $P_{LDC\_average}$, so each of the converters supplies a power of 10 W to a low-voltage load.

Differences among $SoC_1$, $SoC_2$, and $SoC_3$ occur over time. When this occurs and the output value of each of the converters is defined to be substantially the same, the SoCs of the plurality of batteries remain unequal, which may cause one or more of the batteries to be overdischarged or damaged. Also, when the plurality of batteries are charged in a state in which the SoCs of the plurality of batteries remain unequal, one or more of the batteries may not be fully charged, so an energy utilization of the plurality of batteries may decrease. Thus, when the plurality of batteries are charged and discharged in a state in which the SoCs of the plurality of batteries remain unequal, for example, the plurality of batteries may be damaged, life times of the batteries may be reduced, and the energy utilization of the plurality of batteries may decrease.

In one example, to compensate for the plurality of batteries having unequal SoCs, when the absolute value of $\Delta SoC_n$ is greater than 0.01, the output value of each of the converters is defined to be $P_{LDC\_average}+P_{LDC\_average}*\Delta SoC_n$. Thus, indicated in a right portion of FIG. 1B, the output values of the converters are defined to be different from one another.

For example, assume that $SoC_1$=0.53, $SoC_2$=0.75, and $SoC_3$=0.46. In this example, $SOC_{average}$=(0.53+0.75+0.46)/3=0.58, and $\Delta SoC_1$=−0.05, $\Delta SoC_2$=0.17, and $\Delta SoC_3$=−0.12. Thus, the absolute value of $\Delta SoC_n$ is greater than 0.01. In this example, the processor 110 defines $P_{Target\_1}$ through $P_{Target\_3}$ as follows:

$P_{Target\_1}$=10+10*(−0.05)=9.5 W;

$P_{Target\_2}$=10+10*(0.17)=11.7 W; and $P_{Target\_3}$=10+10*(−0.12)=8.8 W.

Thus, a battery_2 corresponding to $SoC_2$ supplies more than the average required power $P_{LDC}$ to the low-voltage load, and a battery_1 corresponding to $SoC_1$ and a battery_3 corresponding to $SoC_3$ supply less than the average required power $P_{LDC}$ to the low-voltage load. Since $SoC_3$ is less than $SoC_1$, the battery_3 supplies less power to the low-voltage load than does the battery_1. This will cause $SoC_1$, $SoC_2$, and $SoC_3$ to be equalized. Thus, the pluralities of batteries will not be overcharged despite an increase in charging and discharging counts of the plurality of batteries. Also, the energy utilization of the plurality of batteries will increase and lifetimes of the plurality of batteries will be prolonged.

Even though each of $P_{Target\_1}$, $P_{Target\_2}$, and $P_{Target\_3}$ may be defined to have a different value, a sum of $P_{Target\_1}$, $P_{Target\_2}$, and $P_{Target\_3}$ remains 30 W. For example, the processor 110 defines each of $P_{Target\_1}$, $P_{Target\_2}$, and $P_{Target\_3}$ so that each of $P_{Target\_1}$, $P_{Target\_2}$, and $P_{Target\_3}$ differs from one another yet still satisfies a required power of a load. Thus, a predetermined amount of power is supplied to the low-voltage load even though each of $P_{Target\_1}$, $P_{Target\_2}$, and $P_{Target\_3}$ may be defined to have a different value.

Although in the above example, the absolute values of all three of $\Delta SoC_1$, $\Delta SoC_2$, and $\Delta SoC_3$ are greater than 0.01, the output value of each of the converters may be defined to be $P_{LDC\_average}+P_{LDC\_average}*\Delta SoC_n$ even when the absolute values of only one or two of $\Delta SoC_1$, $\Delta SoC_2$, and $\Delta SoC_3$ are greater than 0.01. More generally, when the absolute value of at least one $\Delta SoC_n$ among a plurality of $\Delta SoC_n$ is greater than a preset value, for example, 0.01 as in the above example, the output value of each of the converters may be defined to be $P_{LDC\_average}+P_{LDC\_average}*\Delta SoC_n$.

In another example, when the state difference information is not within the first range, the processor 110 determines whether the state difference information has a negative value. In the foregoing example, $\Delta SoC_1$ (−0.05) and $\Delta SoC_3$ (−0.12) have negative values. The processor 110 sets the state difference information $\Delta SoC_n$ having the negative values to be 0. That is, when $\Delta SoC_n$<0, the processor 110 sets $\Delta SoC_n$ to be 0 and determines $P_{Target\_n}$ using the $\Delta SoC_n$ set to 0. This causes $P_{Target\_1}$ and $P_{Target\_3}$ to be defined as 10 W, rather than 9.5 W and 8.8 W as in the foregoing example, while $P_{Target\_2}$ remains defined to be 11.7 W as in the foregoing example. In this example, a sum of $P_{Target\_1}$, $P_{Target\_2}$) and $P_{Target\_3}$ is 31.7 W, which is greater than the $P_{LDC}$ of 30 W. When the sum of all of the $P_{Target\_n}$ is greater than $P_{LDC}$, an excess portion of the power exceeding $P_{LDC}$ is supplied to an auxiliary power storage to charge the auxiliary power storage.

In another example, when the state difference information has a negative value, the processor 110 does not set the state difference information to be 0, and generates a control signal to control a converter corresponding to the battery having the state difference information with a negative value to charge the battery. When $\Delta SoC_n$ has a negative value, this means that the power stored in a battery_n is less than the power stored in other batteries. Thus, the processor 110 generates a control signal to charge the battery_n. This causes the battery_n to charged and the SoCs of the plurality of batteries to be equalized.

Referring back to FIG. 1A, the signal generator 120 generates a control signal to control each of the converters so that power corresponding to the output values of the converters is supplied to the low-voltage load. As an example, the signal generator 120 generates the control signal based on $P_{Target\_n}$. Also, the battery control apparatus 100 performs cell balancing by defining a different output value for each of the converters.

The battery control apparatus 100 may further include a communicator (not shown). The communicator transmits the control signal generated by the signal generator 120 to each of the plurality of batteries. For example, the communicator may transmit the control signal based on a controller area network (CAN) communication scheme, a one-wire communication scheme, or a two-wire communication scheme. However, these communication schemes are merely examples, and a communication scheme of the communicator is not limited thereto.

Figure 2:
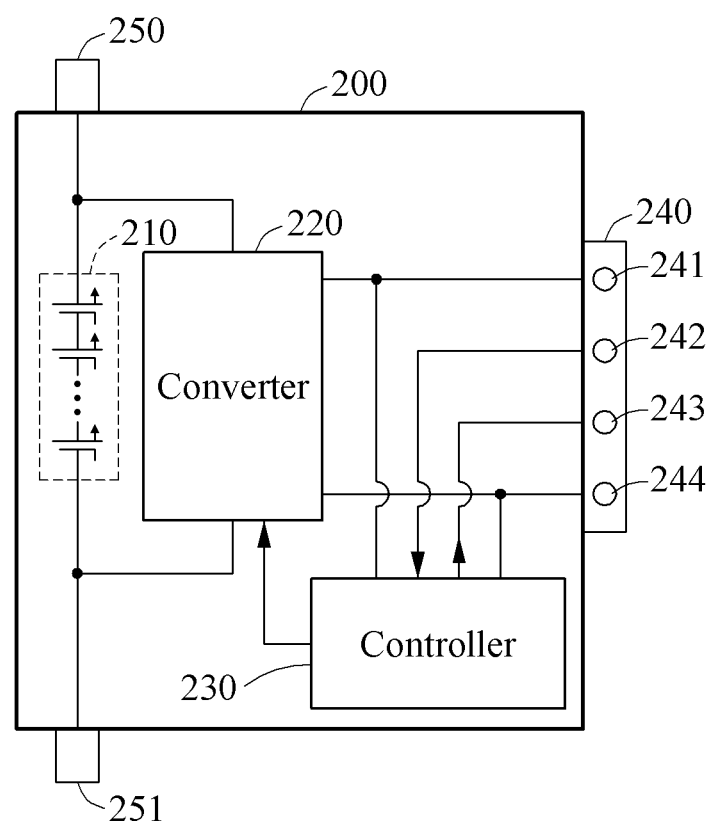
FIG. 2 illustrates an example of a battery module.
Figure 3:
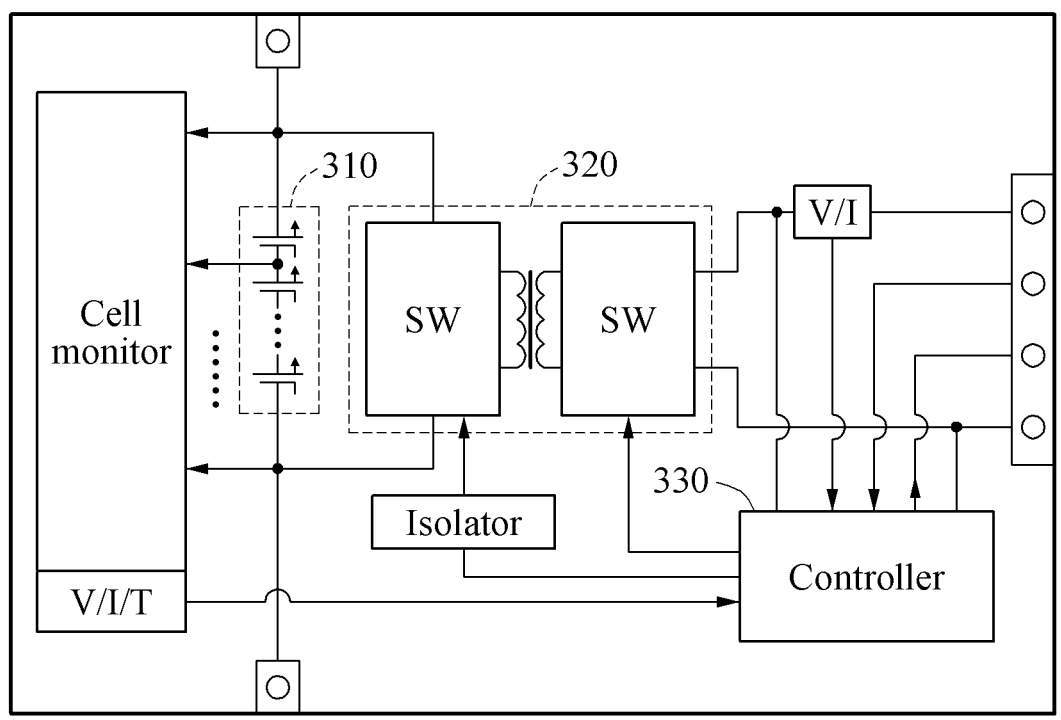
FIG. 3 illustrates another example of a battery module.
Figure 4:
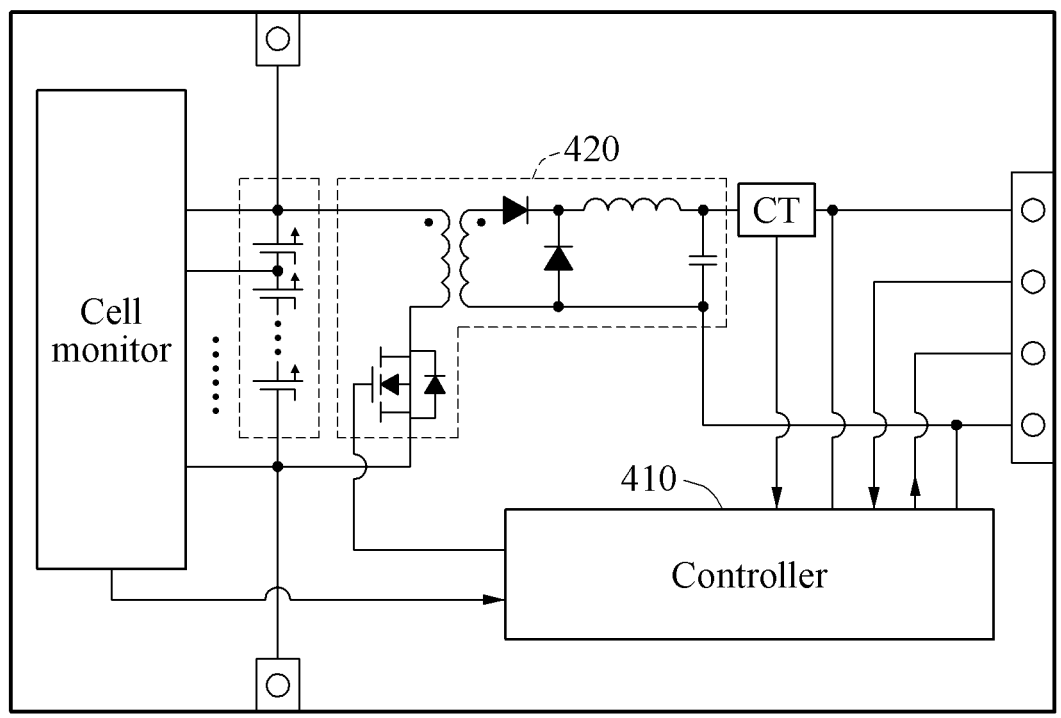
FIG. 4 illustrates another example of a battery module.

FIGS. 2-4 illustrate examples of a battery module.

Referring to FIG. 2, a battery module 200 includes a battery cell 210 or a plurality of battery cells, a converter 220, a controller 230, a first connector 240, and second connectors 250 and 251.

The battery cell 210 stores power. When the plurality of battery cells are provided as the battery cell 210, the plurality of batteries are connected to one another in series.

The converter 220 is electrically connected to the battery cell 210. The converter 220 controls any combination of any two or more of an output current, an output voltage, and an output power of the battery cell 210.

In one example, the converter 220 is a bidirectional converter. In this example, the battery module 200 has a structure illustrated in FIG. 3. Referring to FIG. 3, a battery cell 310 is charged based on an operation of a bidirectional converter 320.

In another example, the converter 220 is an isolated converter. The isolated converter may be, for example, a forward converter. A configuration of a battery module including the forward converter is described with reference to FIG. 4. In contrast to the battery cell 310 of FIG. 3, the battery cell 310 is not charged based on an operation of a forward converter 420. Referring to FIG. 4, a controller 410 generates a gate driving signal based on a control signal received from an external controller, and outputs the gate driving signal to the converter 420. A switch included in the converter 420 operates based on the gate driving signal. When the gate driving signal is applied to the switch, the switch enters an ON state so that a current flows through a primary winding wire of the converter 420. In response to the current flowing through the primary winding wire, an induced current flows through a secondary winding wire through a mutual induction with the primary winding wire. The induced current flowing through the secondary winding wire is an output current corresponding to an output value of the converter 420.

Referring again to FIG. 2, controller 230 controls the converter 220, and communicates with an external controller through a receiving port 242 and a transmitting port 243 included in the first connector 240. Also, the controller 230 transmits sensing data of the battery cell 210 to the external controller.

The description of the battery control apparatus of FIGS. 1A and 1B is also applicable to FIG. 2, so repeated descriptions related to the external controller have been omitted.

The controller 230 receives the output value defined based on state information of the battery module 200 and other battery modules from the external controller. Also, the controller 230 controls the converter 220 so that power corresponding to the output value of the converter 220 is supplied to a load. The controller 230 controls the converter 220 based on the control signal. The converter 220 controls the battery cell 210 so that the power corresponding to the output value is supplied to a low-voltage load.

An output end of the converter 220 is connected to a low-voltage port 241, for example, a $12V_{DC}$ port, and a ground port 244 included in the first connector 240. The power output from the converter 220 is supplied to the low-voltage load. The low-voltage load includes a system configured to operate at a low voltage, for example, 12 volts (V), such as a posture control system or a temperature control system of an electrical moving body. Also, the low-voltage load includes an auxiliary power storage. The power output from the converter 220 is stored in the auxiliary power storage.

The second connectors 250 and 251 of the battery module 200 are connected to second connectors of other battery modules. The battery module 200 is connected to the other battery module in series and supplies power to a high-voltage load based on a control of the external controller. The high-voltage load includes, for example, any one or any combination of any two or more of an on-board charger, an inverter, and a motor of an electrical moving body.

Figure 5:
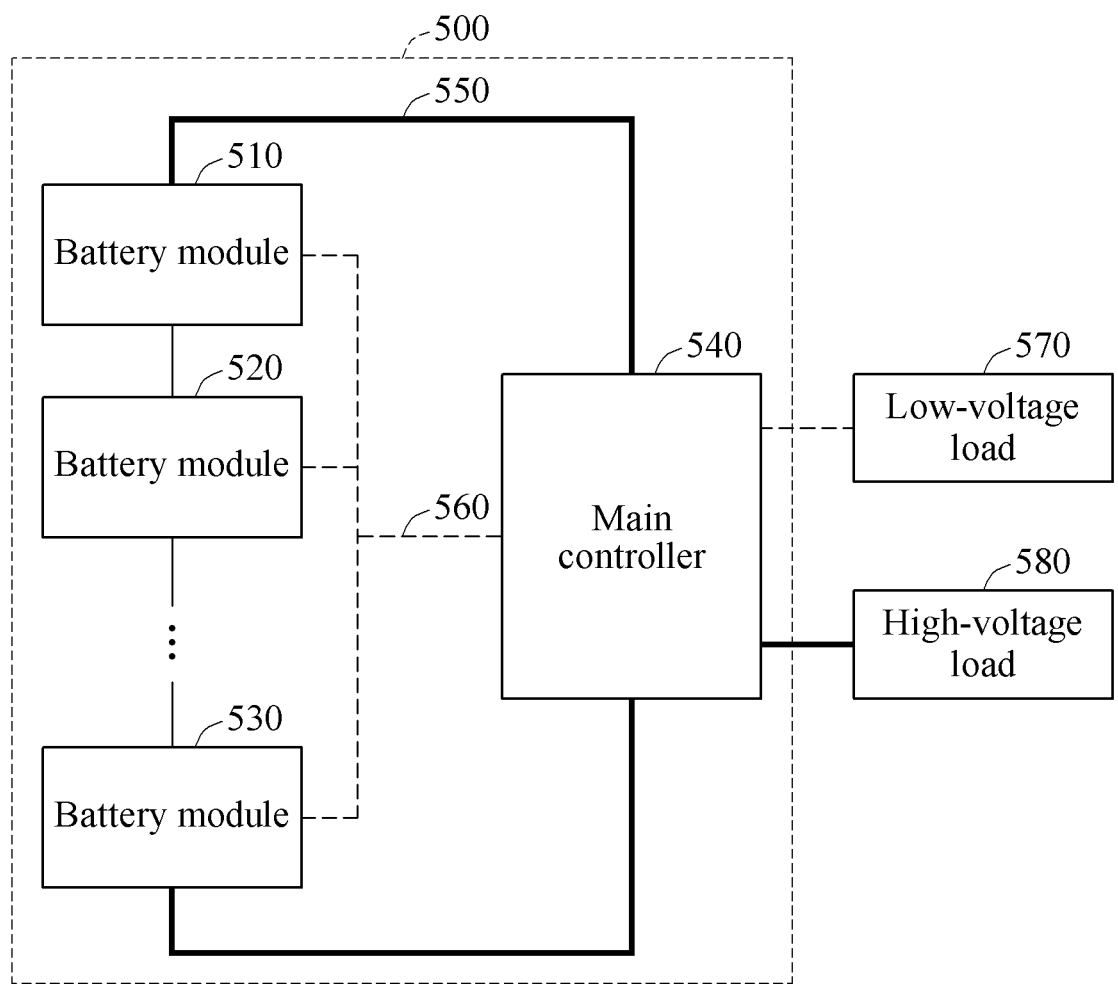
FIG. 5 illustrates an example of a battery pack.

FIG. 5 illustrates an example of a battery pack.

Referring to FIG. 5, a battery pack 500 includes a plurality of battery modules 510, 520, and 530, and a main controller 540. As described with reference to FIG. 2, the battery pack 500 also includes converters respectively corresponding to the plurality of battery modules.

Each of the plurality of battery modules 510, 520, and 530 includes a battery cell or a plurality of battery cells, and a sub-controller.

A converter corresponding to each of the plurality of battery modules 510, 520, and 530 is a DC/DC converter, and may be, for example, an isolated converter. The converter converts power stored in a battery cell to correspond to an operation voltage, for example, 12 V, of a low-voltage load. The converter is located internally or externally to a battery module.

The sub-controller transmits sensing data of a battery module to the main controller. The main controller 540 defines an output value of the converter corresponding to each of the plurality of battery modules 510, 520, and 530 based on state information of corresponding to the plurality of battery modules 510, 520, and 530. The descriptions related to the foregoing example of defining the output value of the converter by determining whether the state difference information is included in the first range are also applicable to FIG. 5, so repeated descriptions have been omitted. Hereinafter, an example in which the main controller 540 defines the output value of the converter by determining desired information will be described.

The main controller 540 defines the output value of the converter by determining whether $SoC_n$ is within a second range. The second range may be, for example, from $SoC_{average}*(1-a)$ to $SOC_{average}*(1+a)$, where a is a constant, for example, 0.01. In the example of FIG. 1B, the second range may be 0.57 (=0.58*0.99)≤$SoC_n$≤0.59 (=0.58*1.01). Also, the main controller 540 determines a maximum value and a minimum value among $SoC_1$ through $SoC_N$. Subsequently, the main controller 540 determines whether a difference between the maximum value and the minimum value is greater than or equal to a preset range, and defines the output value of the converter based on a result of the determining. When $SoC_n$ is outside the second range, or when the difference between the maximum value and the minimum value is greater than or equal to the preset range, the main controller 540 defines $P_{Target\_n}$ to be $P_{LDC\_average}$+ $P_{LDC\_average}*\Delta SoC_n$ to compensate for unequal SoCs of the battery cells in the battery modules 510, 520, and 530.

The output value of the converter may also defined based on a capacity of the battery module in lieu of the SoC of the battery module. Based on a relationship, for example, $Capacity_n$–$Capacity_{average}$=$\Delta Capacity_n$, the main controller 540 defines $P_{Target\_n}$. For example, when $\Delta Capacity_n$ is greater than 0.01, the main controller 540 defines $P_{Target\_n}$ based on $P_{LDC\_average}*\Delta Capacity_n$. Also, the main controller 540 may define $P_{Target\_n}$ based on $\Delta SoC_n$ and $\Delta Capacity_n$. However, the defined output value is merely an example, and a manner of defining the output value of the converter is not limited thereto.

The main controller 540 generates a control signal to control the converter so that power corresponding to the output value is supplied to the load. Also, the main controller 540 transmits the control signal to each of the plurality of battery modules 510, 520, and 530. The sub-controller included in each of the plurality of battery modules 510, 520, and 530 controls the converter based on the control signal.

The battery pack 500 includes a bus 560 configured to supply power to a low-voltage load 570 and a bus 550 configured to supply power to a high-voltage load 580. In FIG. 5, the bus 550 is indicated by a solid line and the bus 560 is indicated by a dashed line. The plurality of battery modules 510, 520, and 530 connected in series with one another are connected to the bus 550. The plurality of battery modules 510, 520, and 530 supply to the high-voltage load 580 the power stored in the battery cell of each of the plurality of battery modules 510, 520, and 530 without conversion. Also, each of the plurality of battery modules 510, 520, and 530 steps down the power stored in the battery cell from a high-voltage to a low-voltage through the converter, and supplies down-stepped power to the low-voltage load 570.

The descriptions of FIGS. 1A through 4 are also applicable to FIG. 5, so repeated descriptions related to FIG. 5 have been omitted. The description of FIG. 5 is also applicable to FIGS. 1A through 4.

Figure 6:
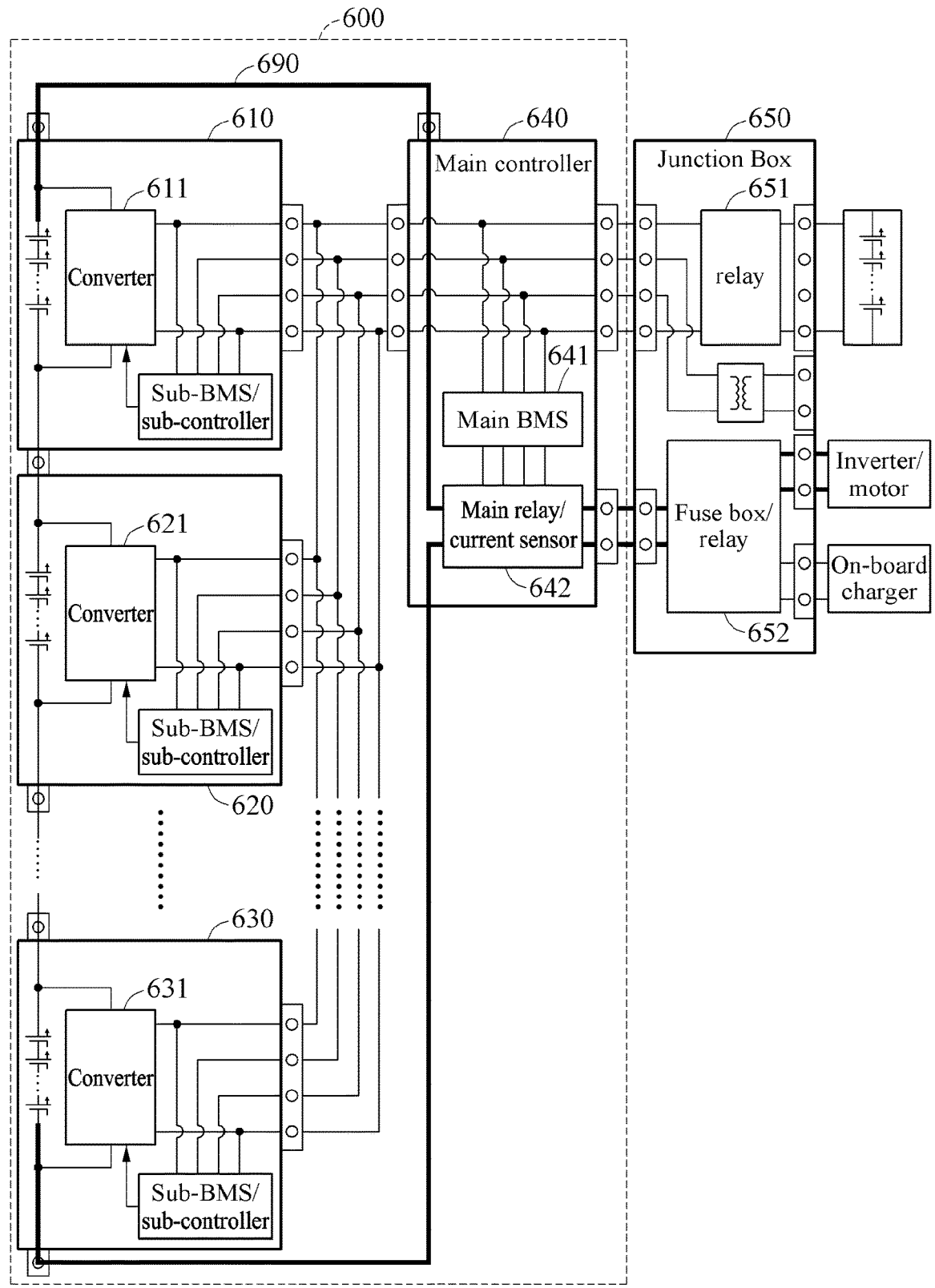
FIG. 6 illustrates another example of a battery pack.

FIG. 6 illustrates another example of a battery pack.

Referring to FIG. 6, a battery pack 600 includes a plurality of battery modules 610, 620, and 630 and a main controller 640.

The plurality of battery modules 610, 620, and 630 includes converters 611, 621, and 631, respectively. Each of the plurality of battery modules 610, 620, and 630 also includes a sub-battery management system (BMS)/sub-controller. The sub-BMS/sub-controller manages any one or any combination of any two or more of a voltage, a current, a temperature, and an impedance of each of the plurality of battery modules 610, 620, and 630. The converters 611, 621, and 631 are connected in parallel.

Each of the plurality of battery modules 610, 620, and 630 may be, for example, the battery module described with reference to FIG. 2. Alternatively, each of the plurality of battery modules 610, 620, and 630 may be, for example, the battery module described with reference to FIG. 3 or FIG. 4.

The main controller 640 includes a main BMS 641, which includes a serial peripheral interface (SPI). The main BMS 641 is connected to a network through the SPI to communicate with the sub-BMS/sub-controller included in each of the plurality of battery modules 610, 620, and 630. By communicating with the sub-BMS/sub-controller, the main BMS 641 transmits a control signal to control each of the converters 611, 612, and 613 to the sub-BMS/sub-controller included in each of the plurality of battery modules 610, 620, and 630. The sub-BMS/sub-controller controls each of the converters 611, 612, and 613 based on the control signal.

The main controller 640 is connected to a junction box 650. The junction box 650 relays low-voltage power and high-voltage power output from each of the plurality of battery modules 610, 620, and 630. A relay 651 included in the junction box 650 transfers the low-voltage power to either one or both of an auxiliary power storage and a low-voltage load. A fuse box/relay 652 included in the junction box 650 transfers the high-voltage power transferred from a main relay/current sensor 642 included in the main controller 640 to a high-voltage load.

The descriptions related to FIGS. 1A through 5 are also applicable to FIG. 6, so repeated descriptions related to FIG. 6 have been omitted.

Figure 7:
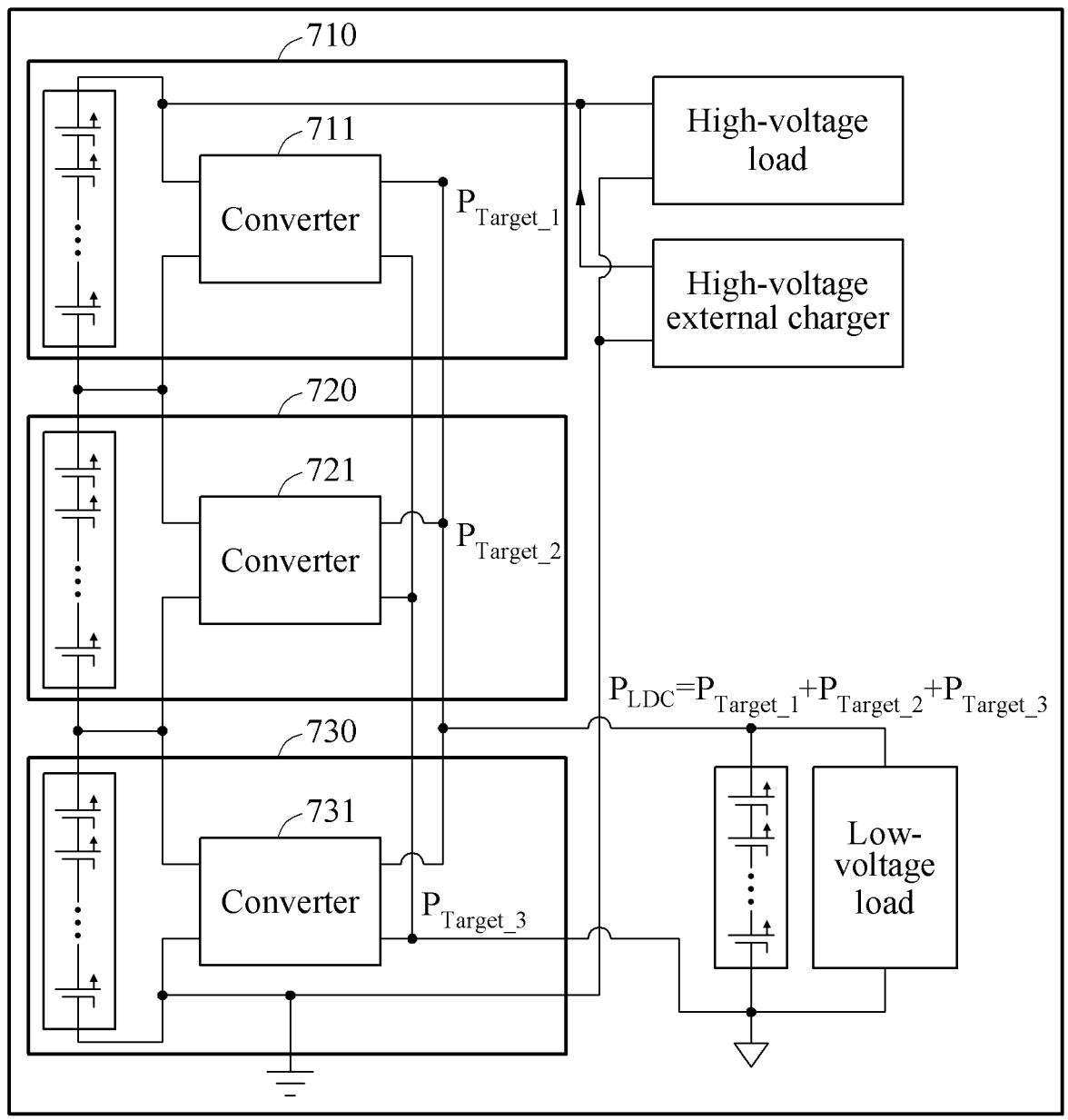
FIG. 7 illustrates an example of a power supply.

FIG. 7 illustrates an example of a power supply.

Referring to FIG. 7, $P_{Target\_1}$ denotes an output power of a converter 711, $P_{Target\_2}$ denotes an output power of a converter 721, and $P_{Target\_3}$ denotes an output power of a converter 731.

Output values of a plurality of converters, for example, the converters 711, 721, and 731, are defined to be different from one another. Thus, each of the plurality of converters outputs a different amount of power. In this example, a total amount of power output by the plurality of converters is not equal to $P_{LDC}$. When the total amount of power output by the plurality of converters is larger than $P_{LDC}$, an amount of power exceeding $P_{LDC}$ is used to charge an auxiliary power storage. When the total amount of power output by the plurality of converters is smaller than $P_{LDC}$, the auxiliary power storage supplies power to a low-voltage load to make up the difference between $P_{LDC}$ and the total amount of power output from the plurality of converters.

Figure 8:
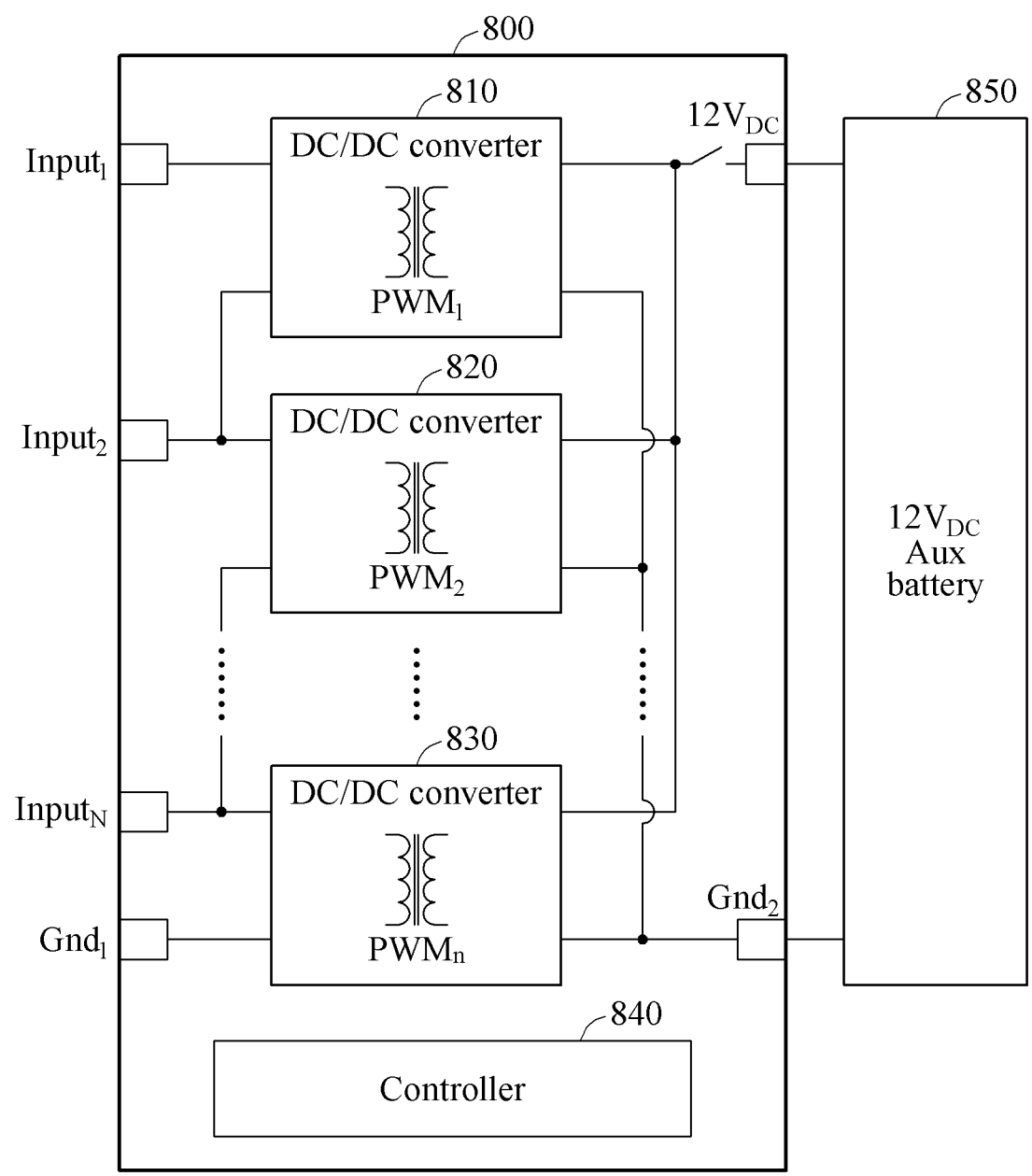
FIG. 8 illustrates an example of a converter package included in a battery pack.

FIG. 8 illustrates an example of a converter package included in a battery pack.

In the example of FIG. 6, each battery module includes a converter and a sub-BMS/sub-controller. In contrast to the example of FIG. 6, in the example of FIG. 8, each battery module does not include a converter and a sub-BMS/sub-controller. Rather, a plurality of converters 810, 820, and 830 and a plurality of sub-BMSs/sub-controllers are implemented in a single converter package 800. The single converter package 800 is, for example, a physical device. A controller 840 is implemented as one physical device including the plurality of sub-BMSs/sub-controllers of FIG. 6.

The single converter package 800 is physically separated from a plurality of battery modules in a battery pack.

Each of the plurality of converters 810, 820, and 830 is connected to a corresponding battery module or battery cell. An output end of a first battery module is connected to the converter 810 through an input voltage terminal $Input_1$. An output end of a second battery module is connected to the converter 820 through an input voltage terminal $Input_2$. An output end of an N-th battery module is connected to the converter 830 through an input voltage terminal $Input_N$. Ground ends of the battery modules are connected to the converter 830 through an input ground terminal $Gnd_1$.

The plurality of converters 810, 820, and 830 are connected in parallel. Each of the plurality of converters 810, 820, and 830 supplies power to an auxiliary power storage 850 and/or a low-voltage load through a low-voltage port having an output voltage terminal $12V_{DC}$ and an output ground terminal $Gnd_2$.

The descriptions of FIGS. 1A through 7 are also applicable to FIG. 8, so repeated descriptions related to FIG. 8 have been omitted.

Figure 9:
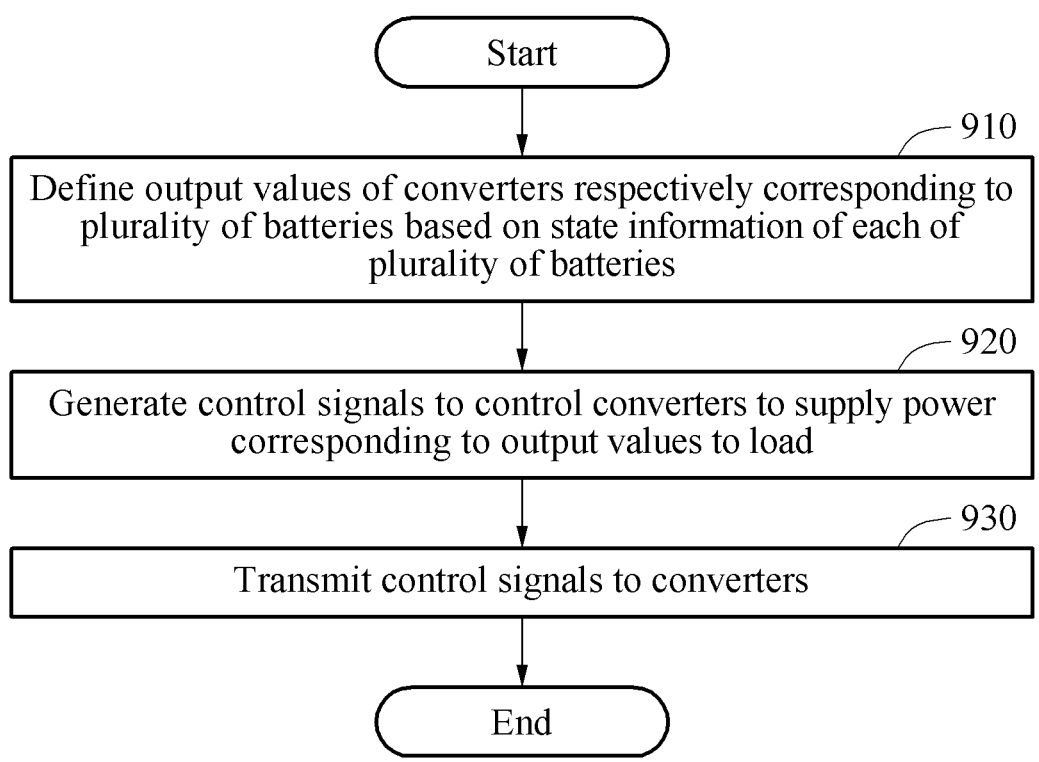
FIG. 9 illustrates an example of a battery control method.

FIG. 9 illustrates an example of a battery control method.

The battery control method is performed by a battery control apparatus.

Referring to FIG. 9, in operation 910, the battery control apparatus defines an output value of a converter corresponding to each of a plurality of batteries based on state information of each of the plurality of batteries.

In operation 920, the battery control apparatus generates a control signal to control the converter so that power corresponding to the defined output value is supplied to a load.

In operation 930, the battery control apparatus transmits the control signal. For example, the battery control apparatus transmits the control signal to a controller included in each of the plurality of batteries.

The descriptions of FIGS. 1A through 8 are also applicable to FIG. 9, so repeated descriptions related to FIG. 9 have been omitted.

Figure 10:
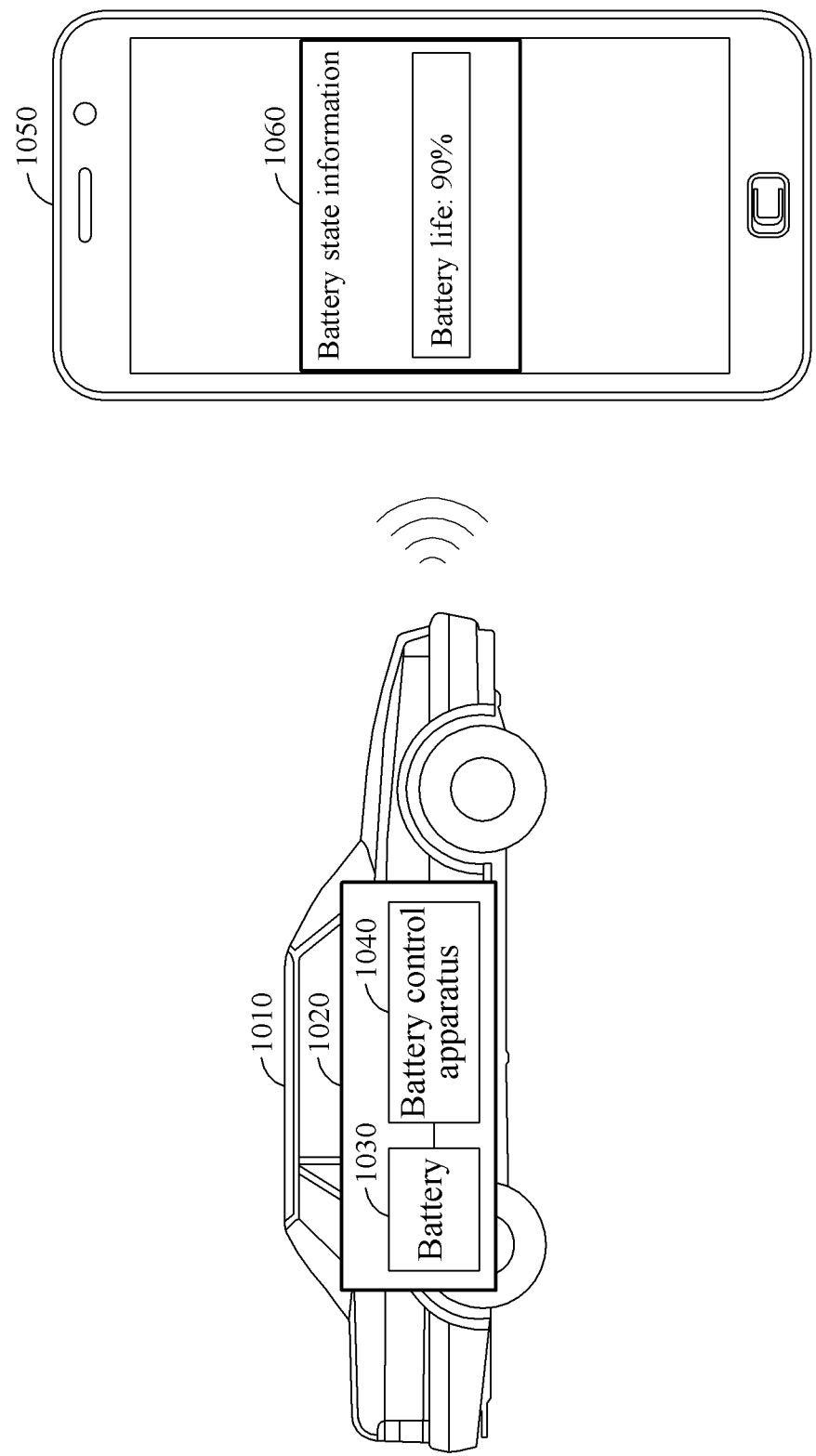
FIG. 10 illustrates an example of a user interface to provide battery state information.

FIG. 10 illustrates an example of a user interface to provide battery state information.

Referring to FIG. 10, an electric vehicle 1010 includes a battery system 1020.

The battery system 1020 includes a plurality of batteries including a battery 1030 and a battery control system 1040.

The battery 1030 includes a battery module or a battery cell.

When a charging and discharging cycle of a battery pack having a performance deviation, for example, a voltage difference and/or a capacity difference, among the plurality of batteries is repeated, overcharging and overdischarging may occur. The overcharging and overdischarging may cause degradation in the plurality of batteries, thereby reducing lives of the plurality of batteries.

The battery control system 1040 enables the plurality of batteries to operate in an optimal state based on information including, for example, a voltage, a current, and a temperature of the plurality of batteries. For example, the battery control system 1040 enables the plurality of batteries to operate at an optimal temperature, or maintains SoCs of the plurality of batteries at an appropriate level.

In one example, the battery control apparatus 1040 determines whether state information of the plurality of batteries is corresponds to an equalized state. When the state information does not correspond to the equalized state, power corresponding to state difference information is generated, and the generated power is used as a power source of a low-voltage load. In this example, the state difference information is associated with a state difference in an unequalized state. Based on the state difference information, a balancing of the plurality of batteries is effectively performed, and thus lifetimes of the plurality of batteries are prolonged.

The battery control system 1040 generates information for a safe operation of the battery system 1020 and transmits the information to a terminal. For example, the battery control system 1040 transmits any one or any combination of any two or more of life information, performance information, and a replacement time of the plurality of batteries to a terminal 1050.

In one example, the battery control system 1040 receives a trigger signal from the terminal 1050 through a wireless interface, and determines state information, for example, life information of the battery 1030, based on the trigger signal. The battery control system 1040 transmits the state information to the terminal 1050 through the wireless interface. The terminal 1050 displays the state information of the plurality of batteries using a user interface 1060.

The descriptions of FIGS. 1A through 9 are also applicable to FIG. 10, so repeated descriptions related to FIG. 10 have been omitted.

A battery control apparatus as described above may replace a low-voltage DC/DC converter (LDC) used to charge an auxiliary battery included in an electric moving body, for example, an electric vehicle or an energy storage system. The battery control apparatus may also replace an LDC used to supply power to a sub-system or a device operating at a voltage of 12 $V_{DC}$ included in, for example, the electric moving body.

The battery control apparatus may control power corresponding to a difference in either one or both of SoCs and capacities among battery modules, thereby reducing a size or a weight of a battery pack or a battery module including the battery control apparatus.

The battery control apparatus 100, the processor 110, and the signal generator 120 in FIG. 1A, the controller 230 in FIG. 2, the controller 330 in FIG. 3, the controller 410 in FIG. 4, the main controller 540 in FIG. 5, main BMS 642 and the sub-BMSs/sub-controllers in FIG. 6, the controller 840 in FIG. 8, and the battery control apparatus 1040, the terminal 1050, and the user interface 1060 in FIG. 10 that perform the operations described herein with respect to FIGS. 1A-10 are implemented by hardware components. Examples of hardware components include controllers, sensors, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1A-10. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 9 that performs the operations described herein with respect to FIGS. 1A-10 are performed by computing hardware, for example, by one or more processors or computers, as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery control apparatus, comprising:
   a processor configured to:
     determine state information of each of batteries connected in series based on sensing data of each of the batteries;
     determine whether the state information corresponds to an un-equalized state; and
     perform an equalization process for at least one of the batteries when the state information corresponds to the un-equalized state,
   wherein, in the equalization process, the processor is further configured to
   control such that a first battery and a second battery, which are in the un-equalized state, supply different power to a load while the first battery and the second battery are discharged, and
   control such that the first battery and the second battery be supplied with corresponding different power while the first battery and the second battery are charged.

2. The battery control apparatus of claim 1, wherein the processor is further configured to, when state of charge (SOC) of the first battery is farther from a criterion and SOC of the second battery is closer to the criterion, and when the SOC of the first battery is greater than SOC of the second battery, control such that the first battery supply more power to the load than the second battery while the first battery and the second battery are discharged.

3. The battery control apparatus of claim 2, wherein the criterion is determined based on an average of SOC of each of the batteries.

4. The battery control apparatus of claim 1, wherein the processor is further configured to, when SOC of the first battery is farther from the criterion and SOC of the second battery is closer to the criterion, and when the SOC of the first battery is lower than the SOC of the second battery, control such that the second battery supply more power to the load than the first battery while the first battery and the second battery are discharged.

5. The battery control apparatus of claim 1, wherein the processor is further configured to determine an amount of power being supplied by the first battery based on a required power of the load and state difference information of the first battery.

6. The battery control apparatus of claim 5, wherein the processor is further configured to determine the state difference information of the first battery based on state information of the first battery and an average of the state information of each of the batteries.

7. The battery control apparatus of claim 1, wherein the processor is further configured to determine an amount of power being supplied by the second battery based on a required power of the load and state difference information of the second battery.

8. The battery control apparatus of claim 7, wherein the processor is further configured to determine the state difference information of the second battery based on state information of the second battery and an average of the state information of each of the batteries.

9. A processor-implemented battery control method for a battery controlling apparatus, comprising:
   determining state information of each of batteries connected in series based on sensing data of each of the batteries;
   determining whether the determined state information corresponds to an un-equalized state; and
   performing an equalization process for at least one of the batteries when the determined state information corresponds to the un-equalized state,
   wherein the performing of the equalization process comprises:
   performing control of a first battery and a second battery, which are in the un-equalized state, to supply different power to a load while the first battery and the second battery are discharged; and
   performing another control of the first battery and the second battery to be supplied with corresponding different power while the first battery and the second battery are charged.

10. The battery control method of claim 9, wherein the performing of the controlling, while the first battery and the second battery are discharged, comprises controlling of the first battery to supply more power to the load than the second battery when state of charge (SOC) of the first battery is farther from a criterion and SOC of the second battery is closer to the criterion, and when the SOC of the first battery is greater than SOC of the second battery.

11. The battery control method of claim 10, wherein the criterion is determined based on an average of the state information of each of the batteries.

12. The battery control apparatus of claim 9, wherein the performing of the controlling, while the first battery and the second battery are discharged, comprises controlling of the second battery to supply more power to the load than the first battery when SOC of the first battery is farther from a criterion and SOC of the second battery is closer to the criterion, and when the SOC of the first battery is lower than the SOC of the second battery.

13. The battery control method of claim 9, further comprising determining an amount of power being supplied by the first battery based on a required power of a load and state difference information of the first battery.

14. The battery control method of claim 13, further comprising determining the state difference information of the first battery based on state information of the first battery and an average of the state information of each of the batteries.

15. The battery control method of claim 9, wherein an amount of power being supplied by the second battery is determined based on a required power of a load and state difference information of the second battery.

16. The battery control method of claim 15, further comprising determining the state difference information of the second battery based on state information of the second battery and an average of the state information of each of the batteries.

17. A vehicle, comprising:
batteries; and
a battery control apparatus configured to
 determine state information of each of the batteries connected in series based on sensing data of each of the batteries,
 determine whether the state information corresponds to an un-equalized state, and
 perform an equalization process for at least one of the batteries when the state information corresponds to the un-equalized state,
wherein, in the equalization process, the battery control apparatus is further configured to control such that a first battery and a second battery, which are in the un-equalized state, supply different power to a load while the first battery and the second battery are discharged, and control such that the first battery and the second battery be supplied with corresponding different power while the first battery and the second battery are charged.

18. The vehicle of claim 17, wherein the battery control apparatus is further configured to, when state of charge (SOC) of the first battery is farther from a criterion and SOC of the second battery is closer to the criterion, and when the SOC of the first battery is greater than SOC of the second battery, control such that the first battery supply more power to the load than the second battery while the first battery and the second battery are discharged.

19. The vehicle of claim 18, wherein the criterion is determined based on an average of SOC of each of the batteries.

20. The vehicle of claim 17, wherein the battery control apparatus is further configured to, when SOC of the first battery is farther from the criterion and SOC of the second battery is closer to the criterion, and when the SOC of the first battery is lower than the SOC of the second battery, control such that the second battery supply more power to the load than the first battery while the first battery and the second battery are discharged.

21. The vehicle of claim 17, wherein the battery control apparatus is further configured to determine an amount of power being supplied by the first battery based on a required power of the load and state difference information of the first battery.

22. The vehicle of claim 21, wherein the battery control apparatus is further configured to determine the state difference information of the first battery based on state information of the first battery and an average of the state information of each of the batteries.

23. The vehicle of claim 17, wherein the battery control apparatus is further configured to determine an amount of power being supplied by the second battery based on a required power of the load and state difference information of the second battery.

24. The vehicle of claim 23, wherein the battery control apparatus is further configured to determine the state difference information of the second battery based on state information of the second battery and an average of the state information of each of the batteries.

* * * * *